United States Patent
Ewert et al.

[11] 3,794,135
[45] Feb. 26, 1974

[54] MOTOR VEHICLE SEAT BELT OCCUPANT-RESTRAINT SYSTEM

[75] Inventors: Bruno Ewert; Wilfried Roos, both of Russelsheim, Germany

[73] Assignee: General Motors Corporation, Detroit, Mich.

[22] Filed: Dec. 15, 1972

[21] Appl. No.: 315,501

[30] Foreign Application Priority Data
Dec. 21, 1971 Germany................... P 21 63 451.5

[52] U.S. Cl. .............................. 180/82, 280/150 SB
[51] Int. Cl.............................................. B60n 21/10
[58] Field of Search... 280/150 SB; 297/388; 180/82

[56] References Cited
UNITED STATES PATENTS

| | | | |
|---|---|---|---|
| 3,712,401 | 1/1973 | Rothschild | 280/150 SB |
| 3,613,819 | 10/1971 | Maloney | 297/388 |
| 3,653,714 | 4/1972 | Gentile | 280/150 SB |
| 3,343,623 | 9/1967 | Porter | 180/82 |

*Primary Examiner*—Robert R. Song
*Attorney, Agent, or Firm*—Herbert Furman

[57] ABSTRACT

A seat belt occupant restraint arrangement of the "passive safety belt" type, in which a seat belt is automatically placed in position around the body of an occupant of a seat in a motor vehicle in response to the closing of a vehicle door adjacent said seat, and is removed therefrom in response to the opening of said door, the seat belt being an articulated belt consisting of segment members having their ends movably connected one to another, said belt having retained adjacent thereto a continuous spring strip arranged for longitudinal tensioning and relaxation along said belt; which belt, when the door is open, occupies an upright position adjacent said seat, and which strip, when said door is closed, is tensioned by means of a motorised driving device attached to one end of said belt adjacent one side of said seat and thus is caused to curve downwardly around the body of said occupant until the free end of said belt locks into a belt-locking means adjacent the other side of said seat. Control of the direction of rotation of the motorised driving device is governed by switch control means arranged on the device and on the vehicle door, said switch control means also controlling the locking operation of said belt-locking means. Thus, when the vehicle door is opened, the switch control means releases the free end of said articulated belt from said belt-locking means, and causes the motorised driving device to rotate in a direction which decreases the tension in the spring strip associated with the articulated belt. This in turn allows the spring strip to unbend, thus straightening and lifting the belt from the body of the occupant so that the belt returns to its aforesaid upright position.

10 Claims, 14 Drawing Figures

MOTOR VEHICLE SEAT BELT OCCUPANT-RESTRAINT SYSTEM

The invention relates to a safety belt system for vehicles, particularly motor vehicles, wherein there is provided adjacent a seat of the vehicle a seat belt arrangement which, during closing or opening of a vehicle door adjacent the seat, automatically applies itself to the body of a vehicle occupant in said seat or releases itself therefrom (such systems being known as passive safety belt systems), said arrangement having a releasable attachment point, through whose detachment or attachment as the case may be, the release or application of the entire belt system takes place.

Heretofore, passive safety belt systems have been developed in which seat belts are automatically wrapped round the body of the vehicle occupant when the vehicle door is closed and — conversely — become disengaged when the door is opened so that the occupant can get out. Passive safety belt systems are known which utilise safety belt components and belt fastening devices secured to the inside of the vehicle door, with the other ends of the belt usually fastened to the side of the vehicle seat. Alternatively, in another passive safety belt system, guide rails for the detachable belt ends of the belt lock are provided on the roof frame.

The aim of the present invention is the provision of a safety belt system of the category mentioned above which remains functional during an accident even if doors unexpectedly spring open or parts of the vehicle body are deformed. According to the basic idea of the invention it is proposed that at least one belt of the safety belt system is an articulated belt which consists of a plurality of segment members arranged in a chain-like arrangement which permits an arcuate deformation of the articulated belt in one plane, the segment members of the articulated belt being connected to a spring strip or the like, which is longitudinally displaceable with respect to the segment members by a motorised drive device, and that means are provided whereby one end of the belt which is releasably anchored in a releasable attachment point adjacent the seat is freed simultaneous with, or substantially simultaneous with, the actuation of the spring strip drive device.

The safety-belt system of the invention remains functional when the consequences of an accident mentioned above occur, because the mechanically operable part of the system is not linked mechanically to the door or the roof of the vehicle. The articulated belt in accordance with the invention is arranged to be operated by a pushbutton switch preferably associated with the vehicle door in such a manner that, in opening the vehicle door in question, the belt system is only released from the occupant by operating the door handle to open the door. The automatic detachment of the belt system is thus effected not just by physically opening the door but only occurs when the door is opened by the operation of the door handle. In this way the disadvantage of the system becoming disengaged by the opening of the door inadvertently as mentioned above is avoided. On the other hand the automatic application of the belt system is brought about purely by the action of closing the vehicle door as such.

The seat belt system of the invention is preferably one in which the articulated belt is the pelvic or lap belt. A three-point safety belt system would in this case be characterised in that the extremity of a shoulder belt of usual design is secured at the releasable end of the lap belt and the other extremity of the shoulder belt passes into an automatic belt winding device. A belt system of this type can also be characterised in that the shoulder belt runs through a transit device arranged at the upper end of the seat back — diagonally with respect to the releasable attachment point of the lap belt — and passes into an automatic belt winding device secured to the vehicle floor adjacent the seat. Instead of the transit device, however, the automatic belt winding device can be arranged, if desired, at the upper end of the back rest of the seat.

Another feature of the invention is that the individual segment members each have a substantially rectangular cross-section and are movably jointed to each other to form the belt strap. The individual belt members can for example be fitted into each other, so that a smooth regular appearance of the articulated belt is achieved, in which the individual segment members abut against each other under thrust and the mutually opposite abutting faces are provided with chamfers which diverge from one another in the direction of the body of the vehicle occupant. The chamfers allow the articulated belt to shape itself in the manner of a curved belt when the system is applied. The clothing of the vehicle occupant is prevented from getting caught in these joints by ensuring that the diverging joints created by the chamfers are spanned by a covering which is secured to one of the two adjacent segment members. In addition, the articulated belt can be provided with an appropriate wrapping which acts also as a padding between the segment members and the vehicle occupant.

The spring strip can pass along the outside of the belt strap. According to the invention, however, it is preferred that the belt members are made hollow, and are traversed by the displaceable spring strip. In this way the spring strip remains out of sight.

The individual segment members can be connected together by means of hinged joints, or the like. The proposed hollow design of the segment members however allows the means for an articulated connection between the individual segment members to be arranged inside the latter. According to another aspect of the invention the avoidance of a stress-loaded means of connection between the individual segment members can be obtained by arranging for the spring strip to be firmly connected to the terminal segment member of the articulated belt. The tensioning forces acting on the articulated belt are in this way primarily exerted and taken up by the spring strip.

In order to being about the least possible obstruction to the vehicle occupant in getting in and out of the vehicle, it is useful if the releasable attachment of the articulated belt is arranged near the seat at the door side, and the driving device for the spring strip is arranged at the other side of the seat. This arrangement of the releasable attachment of the belt at the door-side allows an embodiment in which the spring strip has an untensioned shape, and the articulated belt is arranged adjacent the seat along with its driving device, such that the articulated belt in its released position stands beside the seat in an upright posture relative to the vehicle floor. The driving device for the articulated belt, which device preferably consists of a spindle drive actuated by an electric motor, can also be arranged horizontally under the seat to save space.

If the driving device for the articulated belt is provided on the door side, which has certain advantages, then it is proposed in another embodiment of the invention that the driving device is designed to swivel about a support in such a way that the articulated belt in its released position is moved into a rest position which either substantially coincides with the inclination of the back rest or is such that the articulated belt lies parallel to the course of the centre post in a four-door vehicle. In this way the articulated belt not only makes room for the occupant to get into the vehicle, but is also safeguarded from unintentional bending or the like by being in close proximity to the centre post of the vehicle or the back-rest of the vehicle seat.

The curving of the articulated belt necessary for applying the belt system about the occupant can be achieved by arranging for a threaded spindle of the drive device to engage directly with a spindle nut secured to the inner end of the spring strip of the articulated belt. In the invention, however, it is preferred that the threaded spindle of the drive device engages with a spindle nut secured to the first segment member adjacent the driving device, and that a cranked lever is pivoted to this first segment member, one of its lever arms engaging with the end of the spring strip adjacent this first segment member whilst its other arm is in engagement with a pivoted cradle through a roller or the like. Thus when the safety belt system is applied to the occupant both the spring strip, which moves ahead of the articulated belt due to the action of the cranked lever, and the articulated belt itself are moved downwards by the spindle drive, so that the curved articulated belt is applied to the body of the vehicle occupant.

These and other features, advantages and objects of the invention will become more apparent from the following detailed description and drawings, in which.

Figures 3, 4:
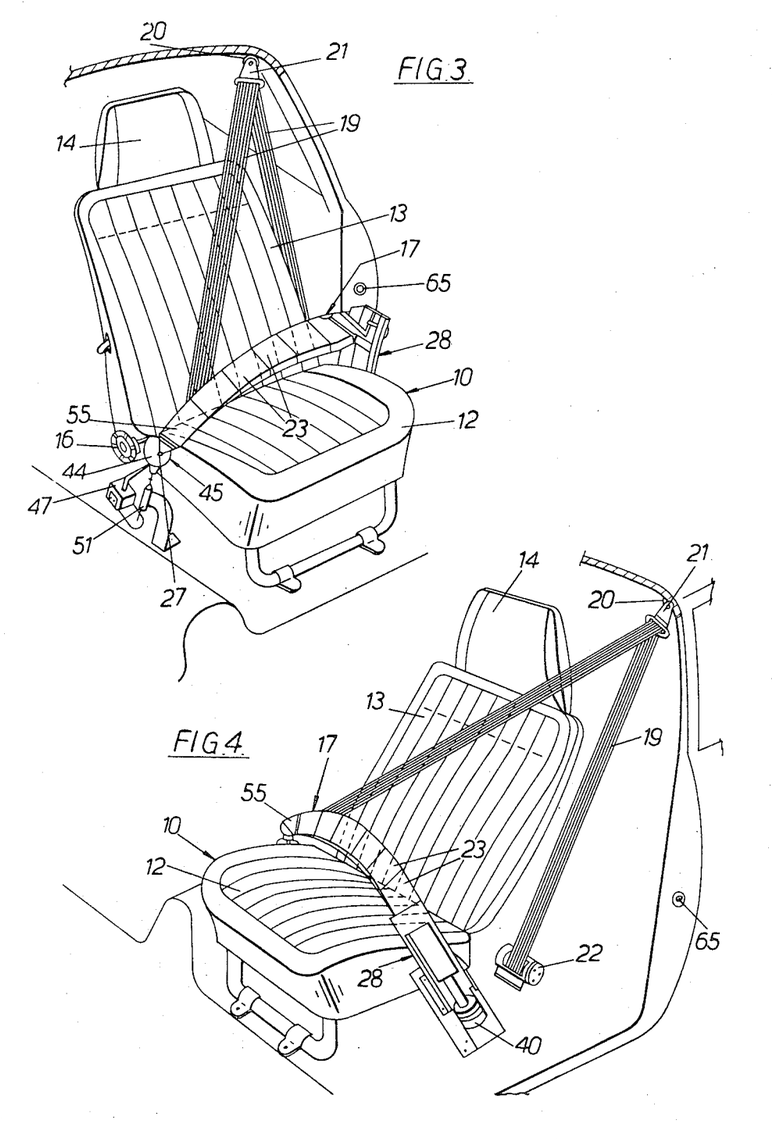
FIG. 3 shows a perspective view of the vehicle seat according to FIG. 1, in which the safety belt system is in its applied position.
FIG. 4 shows another perspective view of the vehicle seat and safety belt system shown in FIG. 3.

In FIG. 1 to FIG. 6 the seat of a vehicle is designated by the numeral 10. The seat 10 is anchored to the vehicle floor 11. The seat 10 consists of a seat surface 12, back rest 13 and head rest 14. To the side of seat 10 there is a fitting 15 (see FIGS. 5 and 6) incorporating an adjusting device 16 for the back rest 13. The safety belt system provided for the seat 10 consists of a lap belt 17 and an oblique shoulder belt 19 fastened to a free extremity 18 of the lap belt 17. As can be seen in FIG. 4, the oblique shoulder belt 19, which is a flexible belt of conventional design, passes through a belt-runner 21 anchored on the upper portion of the side wall 20 of the vehicle body, and then passes into an automatic belt winding device 22 mounted adjacent the floor 11 underneath belt-runner 21 and at the side of the seat 10. Alternatively the belt-runner 21 could be situated on the upper end of the back rest 13, or the automatic belt winding device 22 could replace the belt-runner 21.

Figures 1, 2:
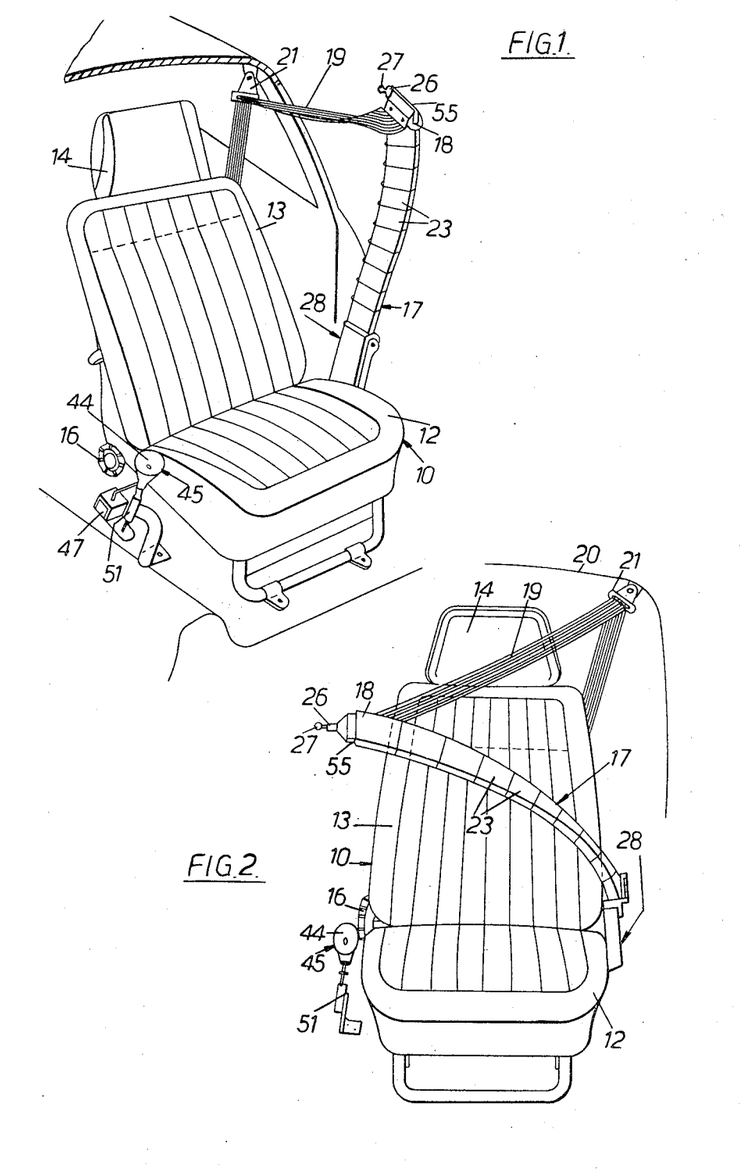
FIG. 1 shows a perspective view of a vehicle seat fitted with a first embodiment of a safety belt system according to the invention, said system being in its released position.
FIG. 2 shows a front view of the vehicle seat according to FIG. 1 in which the safety belt system is in a partially released position.
Figure 5:
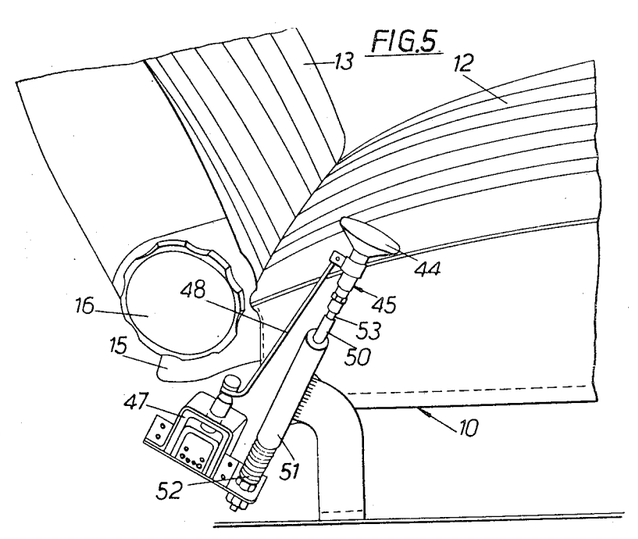
FIGS. 5 and 6 show enlarged side views of part of the vehicle seat according to FIGS. 1 – 4, showing a belt lock mechanism for the safety belt system.
Figure 6:
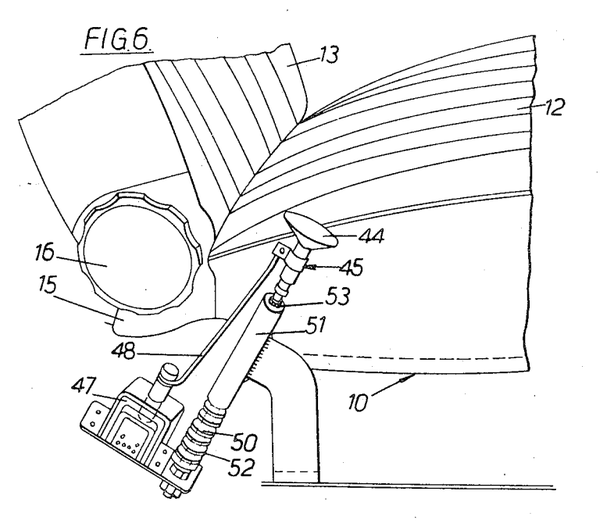
Figures 7, 7A, 8:
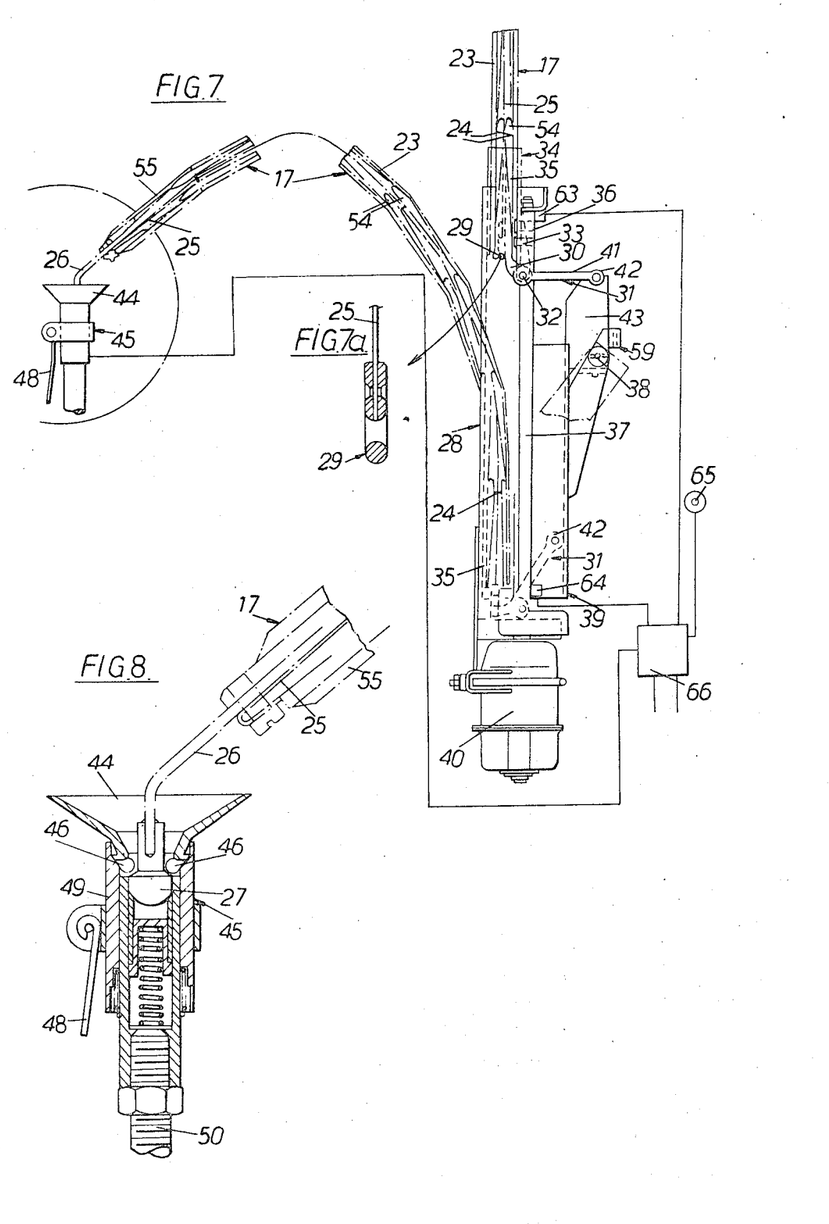
FIG. 7 shows a front view of a driving mechanism for the safety belt system according to the invention.
FIG. 7a shows an enlarged view of a portion of FIG. 7.
FIG. 8 shows a sectional view of the belt lock mechanism for the safety belt system shown in FIGS. 5 and 6.

As can be seen in FIGS. 1 to 8, the lap belt 17 is not a safety belt of conventional design, since it consists of an articulated belt 17 made of a series of segments jointed together, which series of segments serves as the lap belt. When the safety belt system is in its disengaged position, belt 17 assumes an upwardly-extending posture as shown in FIG. 1. This articulated belt 17 consists of a plurality of segment members 23 hingedly connected to each other, the edges of which members are so chamfered that the articulated belt 17 can bend into an arc. This arc-shaped position of the articulated belt 17, which can be seen in FIGS. 3 and 4, is indicated in FIG. 7 by dot-dash lines. The above-mentioned chamfers, which are provided between all the segment members 23 and which make possible the arc-shaped curvature of the articulated belt 17, are denoted in FIG. 7 by the numeral 24. Each segment member 23 has an aperture therethrough extending substantially longitudinally through the member, and a continuous spring strip 25 passes through the apertures of the segment members 23 and is firmly connected to a terminal segment member 55 at the free extremity 18 of the belt 17 by conventional screw means (FIG. 8). This spring strip 25 serves to take up the tension forces exerted on the belt 17 in an accident. The curvature of the belt 17 is brought about by tensioning of the spring strip 25 with respect to the segment members 23. This tension is applied at a crossbar 29 of the inner end of the spring band 25 by a lever arm 30 of a cranked lever 31, which is mounted on a pivot 32 carried on a bearing eye 33 on a belt endpiece 34. Moreover the spring strip 25 has an arcuate pre-tension shape in the opposite direction to the curvature applied by tensioning the spring stirp 25, in order to make possible an automatic alignment of the articulated belt in its upright posture when the applied tensioning force is removed. Each segment member 23 is provided with guide tongues 54 which slide into the adjacent belt member to ensure the location of the segment members relative to one another without displacement and consequent twisting of the belt. As already mentioned, the tongues 54 are so shaped that they sharply restrict any tendency for a mutual kinking movement of two adjacent members 23 relative to one another. The presence of the spring strip 25 in turn safeguards against any tendency to lateral tilting of the members 23 relative to one another.

A terminal segment member 35 is clasped by the belt endpiece 34, which can slide up and down inside an upstanding frame 28. A motorised articulated belt-actuation means mounted on the frame 28 comprises an electric motor 40, an externally threaded spindle 37 and an internally threaded nut 36. The internally threaded nut 36 is fastened to the endpiece 34, and the externally threaded spindle 37 passes through the threaded aperture of said nut in engagement with the threads therein to serve as the drive shaft from the electric motor 40. When the spindle 37 rotates in a direction that makes the nut 36 move axially along the spindle towards the motor 40, then the belt endpiece 34 together with the pivot 32 on the belt-tensioning lever 31 also moves towards the motor 40. A roller 42 is mounted on the arm 41 of the belt-tensioning lever 31, and rests in a semi-circular recess in the upper portion of a pivoted cradle 43, which is pivotally mounted in the frame 28 of the driving mechanism by means of a joint bolt 38. The pivoted cradle 43 is provided with a coiled return spring (not shown in the drawing) by means of which the pivoted cradle 43 is biased against a stop 59. When the pivot 32 moves towards motor 40 as described above, the belt-tensioning lever 31 initially pivots about the roller 42 and then causes the pivoted cradle 43 to pivot about bolt 38 into the position indicated with a dashed line in FIG. 7. When the pivoted cradle 43 has turned through an angle of 90°, the belt-tensioning lever 31 has also pivoted through an angle of about 90°. With the belt-tensioning lever in this position the predetermined maximum displacement of the spring strip 25 under tension is reached, thus producing the predetermined maximum bend in the belt 17. The movement of the belt into the position in which it adopts the predetermined maximum bend results in the terminal member 55 of the belt being brought adjacent a belt locking device 45 connected to the vehicle floor 11. For the purpose of locking the belt 17 in position about an occupant of the seat 10, a locking means comprising a pin-shaped extension 26 is fastened to the terminal member 5, which extension terminates with a spherical head 27 (FIGS. 1, 2 and 8). This head 27 is engageable with the belt locking device 45 equipped with a receiving cone 44 on the other side of the seat 10. The example of the locking device 45 shown in FIG. 8 is well-known and does not form part of the present invention.

The heat 27 of the belt 17 is retained in engagement with the locking devie 45 by means of a number of detention balls 46 retained within a spring loaded locking sleeve 49. To release the lock, the locking sleeve 49 must be moved downwardly away from the cone 44. According to the invention, this is done by an electromagnet 47 which, as shown in FIGS. 5 and 6, is arranged adjacent the base of the locking device 45 and connected to the sleeve 49 by means of a tension member 48. Alternatively, the electromagnet 47 may be arranged so that it surrounds the sleeve 49.

The locking device 45 is movably mounted in a tubular mounting device 51 so as to be capable of some degree of flexibility in the direction of the locked terminal member 55 of belt 17. As shown in FIGS. 5 and 6, this degree of flexibility is brought about by mounting the locking device 45 on one end of a rod 50 threaded through the tubular mounting device, which rod is downwardly biased relative to the tubular mounting device by a spring 52. The extent of this flexible movement can be limited by adjusting a nut 53.

Further movement of the belt endpiece 34 and the pivot 32 towards the motor 40 by means of the rotating spindle 37, after the pivoted cradle 43 has rotated into the position indicated by a dot-dash line and the head 27 has engaged with the belt-locking device 45, allows the belt tensioning lever 31 to pivot fractionally in a direction away from motor 40. The tensioning force of the spring strip 25 is thus fractionally reduced and, since the articulated belt 17 is held in by the flexibly-mounted locking device 45, said articulated belt acquires a certain amount of elasticity so that it can adapt to the body shape of the vehicle occupant as the terminal segment member 35 slides in frame 28 closer towards motor 40. During this movement the roller 42 reaches a guideway 39 secured to frame 28 and moves out of the recess in the pivoted cradle 43, so releasing the pivoted cradle 43, which then snaps back under the force of its spring (not shown in the drawing) into its original position. Contact switches, 63 and 64 respectively, are provided one at each end of the spindle 37, each one being operable by the contact with it of the spindle nut 36. A switch control means 66 connected to a source of electrical power (not shown) controls the unlocking of the floor-connected belt-locking device 45 and the starting, stopping and direction of rotation of motor 40 by means of the operation of the contact switches 63 and 64 in conjunction with a door-operated switch means 65 responsive to door opening and closing.

If the motor 40 is switched on so as to rotate spindle 37 in the sense of an upwards movement of the nut 36, away from motor 40, then the contact switch 64 and the switch control means 66 connect the electromagnet 47 to a current source via a rectifier diode (not shown) and releases the balls 46 in the lock 45, as described above.

Figure 11:
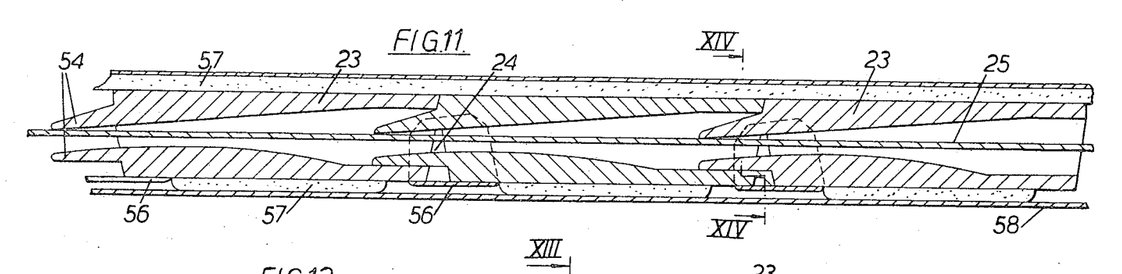
FIG. 11 shows a portion of the articulated belt on an enlarged scale, with the belt in a straightened state.
Figures 12, 13, 14:
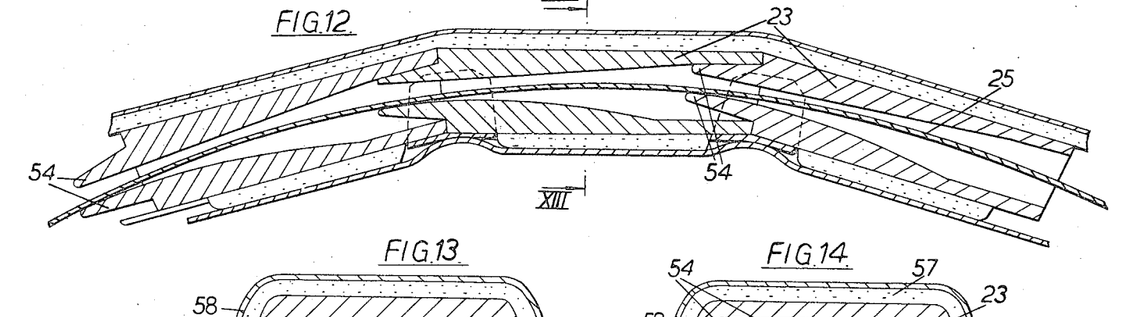
FIG. 12 shows the portion of the articulated belt according to FIG. 11, with the belt in a curved state.
FIG. 13 shows a section through line XIII — XIII of the belt portion shown in FIG. 12.
FIG. 14 shows a section through the line XIV — XIV of the belt portion shown in FIG. 11.

FIGS. 11 and 12 show enlarged sections of a portion of the articulated belt 17 in the straight position and a curved position respectively.

As can be seen in FIGS. 11 and 12, the segment members 23 are covered by elastic pads 56 which span the wedge-shaped recesses formed by the chamfers, so that parts of the clothing of the seat occupant cannot get trapped between the segments. In addition, the belt members 23 are also provided with sponge-like cushioning pads 57 and a continuous elastic covering 58, as also shown in FIGS. 13 and 14.

The specific embodiment of the invention described above, in particular the driving mechanism and the locking device, has been illustrated schematically to assist better understanding of the mechanisms involved. However, the locking device and the driving mechanism would be designed in such a way as to avoid producing any projecting parts, so that they would not endanger the vehicle occupant when the system is in use.

Figures 9, 10:
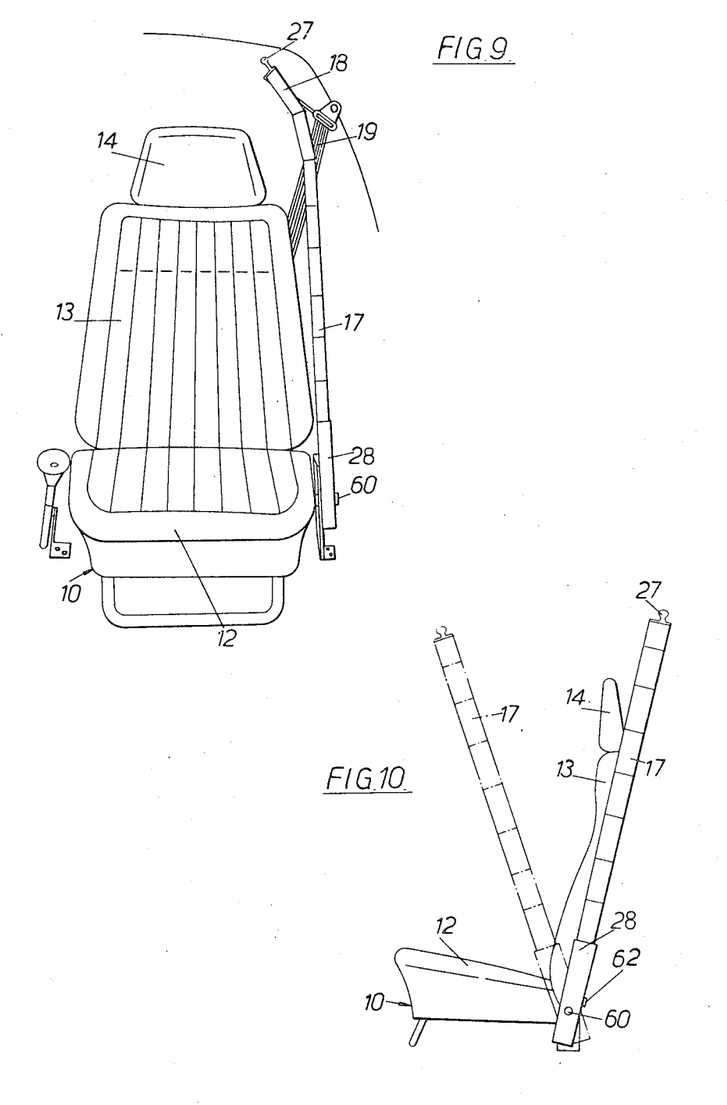
FIGS. 9 and 10 show a front and a side view, respectively, of a vehicle seat fitted with a second embodiment of the safety belt system of the invention.

FIGS. 9 and 10 illustrate a second embodiment of the invention which is a modification of the system illustrated in FIGS. 1 to 8. In FIG. 9 is shown a front view of the driver's seat 10 of the vehicle. The articulated belt 17 and the driving device are therefore located at the side of the seat 10 facing the door. In this arrangement the articulated belt 17 would obstruct entry into the vehicle, because it normally is brought into operation from the position represented in FIG. 10 by a dot-dash line. For this arrangement the driving mechanism frame 28 is pivoted about an axis 60, about which axis the driving mechanism frame 28 together with the articulated belt 17 will pivot automatically when the articulated belt 17 has reached the vertical position on being released. This pivoting movement is sufficient to ensure that the articulated belt 17 assumes a position substantially in alignment with the position of the back-rest 13, as shown in FIG. 10, and as determined by a stop 62. Alternatively, the pivoting movement may be sufficient to allow belt 17 to assume a position substantially in alignment with the position of the centre post in a four-door car. In this way the position of the articulated belt 17 not only allows unobstructed entry into the vehicle by the occupant, but is also protected from unintentional bending by virtue of the proximity of the back-rest and the centre post of the vehicle. When the safety-belt system is applied, the articulated belt 17 is automatically swung forwards about axis 60 until a limit stop (not shown in the drawing) is reached, before belt 17 starts to bend into position over the occupant of seat 10. This swivelling movement can either be carried out by an additional motor not shown in the drawing, or by modifying the existing one. Alternatively, it can be arranged for the swivelling movement to be produced by purely mechanical means actuated by the movement of the door. When the articulated belt 17 is substantially in alignment with the back-rest 13 in the unused position, its upper free extremity 18 can be retained above the back-rest 13 or the head-rest 14 as indicated in FIG. 9.

Thus this invention provides an improved passive seat belt system in which the belt system is automatically placed around the occupant of the vehicle on closing the adjacent vehicle door, and is automatically removed from around the occupant on the opening of said door.

We claim:

1. In a motor vehicle having a floor, a door-operated switch means responsive to door opening and closing, and an occupant seat anchored to the floor, the combination comprising the following: a seat belt occupant-restraint arrangement including an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; a belt-locking means connected to the floor adjacent one side of said seat and co-operable with said locking means on the belt; and motorised articulated belt-actuating means anchored to the floor adjacent the opposite side of the seat, the other end of said spring strip being operably connected to said motorised articulated belt-actuating means; and switch control means co-operable with said door-operated switch means, said floor-connected belt-locking means, and said motorised articulated belt-actuating means such that on actuation of said door operated switch means responsive to door closing, actuation of said motorised articulated belt-actuating means in one direction tensions the spring strip so as, by reason of appropriate shaping of the ends of said segment members, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, and actuation of said motorised articulated belt-actuating means in the reverse direction relaxes the spring strip, whereby, by reason of the unbending of said strip, the articulated belt assumes an upright posture relative to said floor and adjacent said seat.

2. A seat belt occupant-restraint arrangement according to claim 1, in which the articulated belt forms the lap belt of the arrangement.

3. In a motor vehicle having a floor, a door-operated switch means responsive to door opening and closing, and an occupant seat anchored to the floor, the combination comprising the following: a seat belt occupant-restraint arrangement including a flexible belt; an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; an automatic belt-retracting device anchored to said floor adjacent the rear of said seat; one end of said flexible belt being operably connected to said belt retracting device, and the other end of said flexible belt being connected to said articulated belt, adjacent said locking means, to form a lap and diagonal seat belt arrangement in which the articulated belt forms the lap belt; a belt-locking means connected to the floor adjacent one side of said seat and co-operable with said locking means on the belt; and motorised articulated belt-actuating means anchored to the floor adjacent the opposite side of the seat, the other end of said spring strip being operably connected to said motorised articulated belt-actuating means; and switch control means co-operable with said door-operated switch means, said floor-connected belt-locking means, and said motorised articulated belt-actuating means such that on actuation of said door operated switch means responsive to door closing, actuation of said motorised articulated belt-actuating means in one direction tensions the spring strip so as, by reason of appropriate shaping of the ends of said segment members, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, and actuation of said motorised articulated belt-actuating means in the reverse direction relaxes the spring strip, whereby, by reason of the unbending of said strip, the articulated belt assumes an upright posture relative to said floor and adjacent said seat.

4. A seat belt occupant-restraint arrangement according to claim 3, in which each one of said segment members has an aperture extending longitudinally therethrough, and said continuous spring strip extends through said apertures from one end of said articulated belt to the other end of said articulated belt.

5. In a motor vehicle having a floor, a door-operated switch means responsive to door opening and closing, and an occupant seat anchored to the floor, the combination comprising the following: a seat belt occupant-restraint arrangement including a flexible belt; an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; each one of said segment members having an aperture extending longitudinally therethrough, through which aperture extends the continuous spring strip, and the ends of each segment member adjacent said aperture are shaped to complement each other so that the movable connection between each pair of segment members takes the form of a movable bell-and-spigot joint; an automatic belt-retracting device anchored to said floor adjacent the rear of said seat; one end of said flexible belt being operably connected to said belt-retracting device, and the other end of said flexible belt being connected to said articulated belt adjacent said locking means, to form a lap and diagonal seat belt arrangement in which the articulated belt forms the lap belt; a belt-locking means connected to the floor adjacent one side of said seat and co-operable with said locking means on the belt; and motorised articulated belt-actuating means anchored to the floor adjacent the opposite side of the seat, the other end of said spring strip being operably connected to said motorised articulated belt-actuating means; and switch control means co-operable with said door-operated switch means, said floor-connected belt-locking means, and said motorised articulated belt-actuating means such that on actuation of said door operated switch means responsive to door closing, actuation of said motorised articulated belt-actuating means in one direction tensions the spring strip so as, by reason of appropriate shaping of the ends of said segment member, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, and actuation of said motorised articulated belt-actuating means in the reverse direction relaxes the spring strip, whereby, by reason of the unbending of said strip, the articulated belt assumes an upright posture relative to said floor and adjacent said seat.

6. A seat belt occupant-restraint arrangement according to claim 5, in which the edges of each segment member are chamfered such that, on actuation of said motorised articulated belt-actuating means in said one direction, the chamfered portions of the edges of each segment member co-operate with the chamfered portions of the complementary edges of the neighbouring segments to cause the articulated belt to bend preferentially in the direction of the occupant of said seat.

7. A seat belt occupant-restraint system according to claim 6, in which each one of the gaps created between adjacent chamfered portions of the segment members of the articulated belt is spanned by a covering secured to one of the two adjacent segment members.

8. In a motor vehicle having a floor, a door-operated switch means responsive to door opening and closing, and an occupant seat anchored to the floor, the combination comprising the following: a seat belt occupant-restraint arrangement including an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; a belt-locking means connected to the floor adjacent one side of said seat and co-operable with said locking means on the belt; a support member anchored to said floor adjacent the opposite side of said seat, and motorised articulated belt-actuating means swivellably mounted on said support means and adapted to swivel automatically between a forward position and a rearward position relative to said seat, the other end of said spring strip being operably connected to said motorised articulated belt-actuating means; and switch control means co-operable with said door-operated switch means, said floor-connected belt-locking means, and said motorised articulated belt-actuating means such that on actuation of said door operated switch means responsive to door closing, said motorised articulated belt-actuation means swivels from the rearward position to the forward position, and actuation of said motorised articulated belt-actuating means in one direction tensions the spring strip so as, by reason of appropriate shaping of the ends of said segment members, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, actuation of said motorised articulated belt-actuating means in the reverse direction relaxes the spring strip, whereby, by reason of the unbending of said strip, the articulated belt assumes an upright posture relative to said floor and adjacent said seat, and said motorised articulated belt-actuation means swivels from the forward position to the rearward position.

9. In a motor vehicle having a floor, a door-operated switch means responsive to door opening and closing, and an occupant seat anchored to the floor, the combination comprising the following: a seat belt occupant-restraint arrangement including an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; a belt-locking means connected to the floor adjacent one side of said seat and co-operable with said locking means on the belt; a motorised articulated belt-actuating means anchored to the floor adjacent the opposite side of the seat, the other end of said spring strip being operably connected to said motorised articulated belt-actuating means; switch control means co-operable with said door-operated switch means, said floor-connected belt-locking means, and said motorised articulated belt-actuating means such that on actuation of said door operated switch means responsive to door closing, actuation of said motorised articulated belt-actuating means in one direction tensions the spring strip so as, by reason of appropriate shaping of the ends of said segment members, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, and actuation of said motorised articulated belt-actuating means in the reverse direction relaxes the spring strip, whereby, by reason of the unbending of said strip, the articulated belt assumes an upright posture relative to said floor and adjacent said seat; the operable connection between said spring strip and said motorised articulated belt-actuation means comprising the combination of a cranked lever, a pivoted cradle and a guideway, one end of the cranked lever being movably connected to said other end of the spring strip, the fulcrum of the cranked lever being movably mounted upon one end of the pivoted cradle, and said pivoted cradle being mounted upon the motorised articulated belt-actuation means adjacent said guideway, such that, on engagement of the locking means on the belt with the floor-anchored belt-locking means, the fulcrum of the cranked lever moves from the pivoted cradle to the guideway to allow a fractional relaxation of said spring strip to improve the overall elasticity of the engaged articulated belt.

10. In a motor vehicle having a floor, a door-operated switch means responsive to door opening and closing, and an occupant seat anchored to the floor, the combination comprising the following: a seat belt occupant-restraint arrangement including a flexible belt; an articulated belt consisting of segment members having their ends movably connected one to another to form a belt adapted to curve substantially in one plane only, a locking means at one end of said belt, a continuous spring strip anchored at one end to the articulated belt, adjacent said locking means, and being retained for longitudinal tensioning and relaxation along said articulated belt; each one of said segment members having an aperture extending longitudinally therethrough, through which aperture extends the continuous spring strip, and the ends of each segment member adjacent said aperture are shaped to complement each other so that the movable connection between each pair of segment members takes the form of a movable bell-and-spigot joint; an automatic belt-retracting device anchored to said floor adjacent the rear of said seat; one end of said flexible belt being operably connected to said belt-retracting device, and the other end of said flexible belt being connected to said articulated belt, adjacent said locking means, to form a lap and diagonal seat belt arrangement in which the articulated belt forms the lap belt; a belt locking means connected to the floor adjacent one side of said seat and co-operable with said locking means on the belt; a support member anchored to said floor adjacent the opposite side of the seat and motorised articulated belt-actuating means swivellably mounted on said support means and adapted to swivel automatically between a forward position and a rearward position relative to said seat, the other end of said spring being operably connected to said motorised articulated belt-actuating means; and switch control means co-operable with said door-operated switch means, said floor-connected belt-locking means, and said motorised articulated belt-actuating means such that on actuation of said door operated switch means responsive to door closing, said motorised articulated belt-actuation means swivels from the rearward position to the forward position, and, actuation of said motorised articulated belt-actuating means in one direction tensions the spring strip so as, by reason of appropriate shaping of the ends of said segment members, to cause said belt and strip to bend around an occupant of the seat until said locking means in the belt engages with said floor-connected belt locking means; and, on actuation of said door-operated switch means responsive to door opening, said floor-connected belt-locking means releases said locking means in the belt, and actuation of said motorised articulated belt-actuating means in the reverse direction relaxes the spring strip, whereby, by reason of the unbending of said strip, the articulated belt assumes an upright posture relative to said floor and adjacent said seat, and said motorised articulated belt-actuation means swivels from the forward position to the rearward position.

* * * * *